May 20, 1941.  O. W. GITHENS ET AL  2,242,464
MOTION PICTURE PROJECTOR
Original Filed June 3, 1937  3 Sheets-Sheet 2

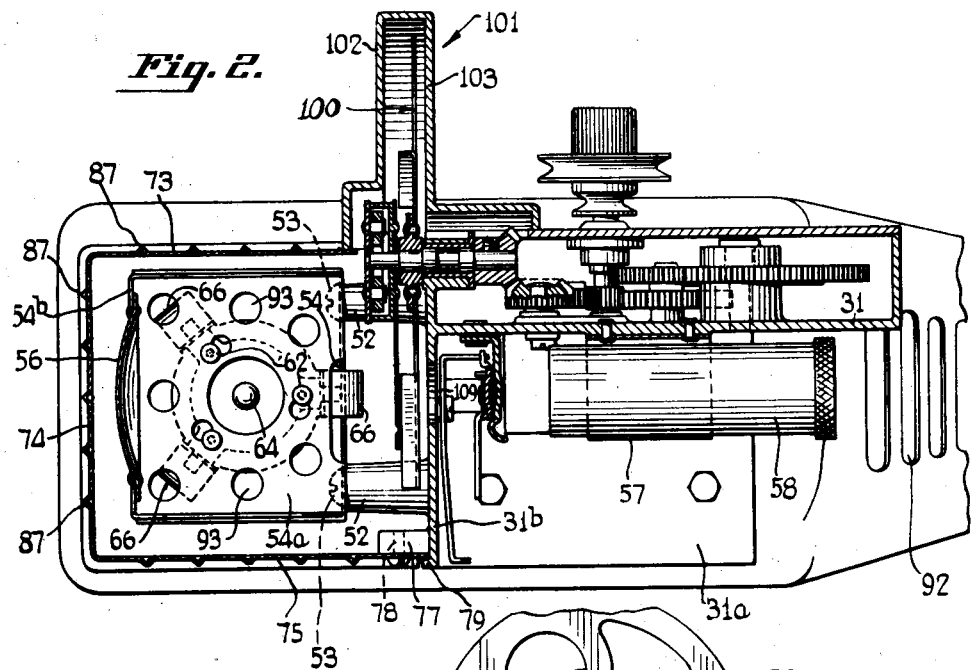
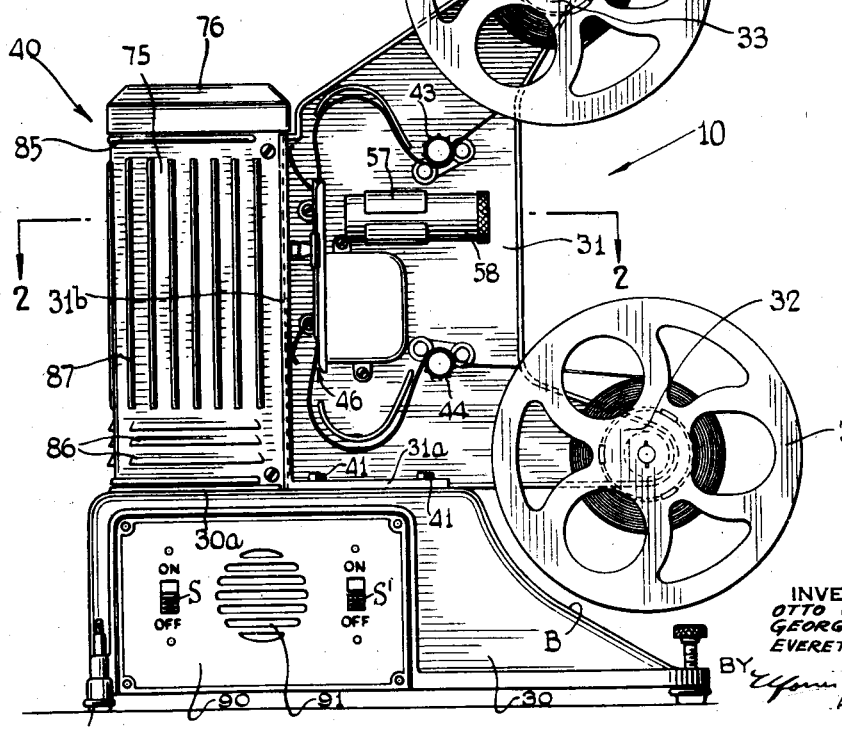

INVENTORS
OTTO W. GITHENS
GEORGE KENDE
EVERETT M. PORTER
BY
ATTORNEY

May 20, 1941.  O. W. GITHENS ET AL  2,242,464
MOTION PICTURE PROJECTOR
Original Filed June 3, 1937  3 Sheets-Sheet 3

INVENTORS
OTTO W. GITHENS
GEORGE KENDE
EVERETT M. PORTER
BY
ATTORNEY

Patented May 20, 1941

2,242,464

UNITED STATES PATENT OFFICE 2,242,464

MOTION PICTURE PROJECTOR

Otto W. Githens and George Kende, New York, and Everett M. Porter, Brooklyn, N. Y., assignors to Universal Camera Corporation, New York, N. Y., a corporation of Delaware Original application June 3, 1937, Serial No. 146,182. Divided and this application December 21, 1939, Serial No. 310,344

5 Claims. (Cl. 88—24)

This invention relates generally to motion picture projectors, and has for one of its objects the provision of a motion picture projector having highly improved constructional features relating to the supporting and housing of the light source.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the claims.

Certain features shown and described but not claimed in this application are shown, described and claimed in our copending application, Serial No. 146,182, filed June 3, 1937, which has become Patent No. 2,190,658, dated February 20, 1940, for Motion picture projectors, of which the present application is a division.

In the accompanying drawings, in which is shown one of the various possible embodiments of this invention, Fig. 1 is a side elevational view of a motion picture projector embodying our invention;

Fig. 2 is an enlarged cross-sectional view taken substantially on the line 2—2 of Fig. 1;

Figure 3:
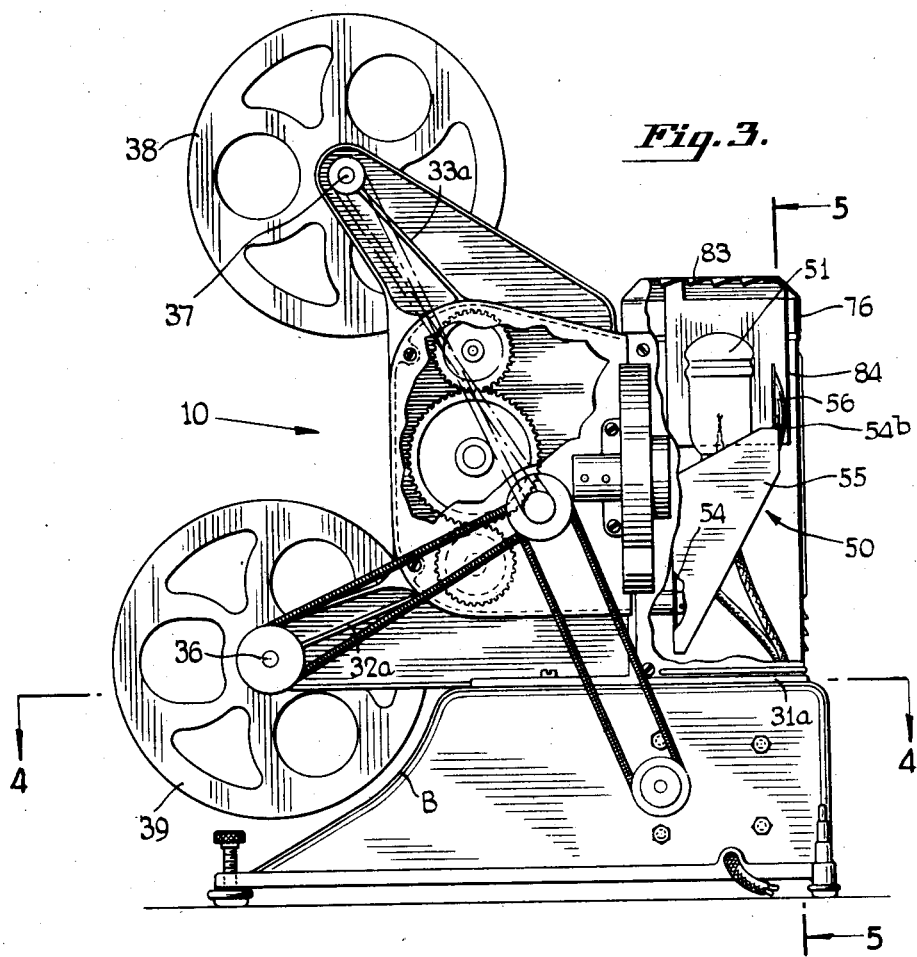
Fig. 3 is an elevational view similar to Fig. 1, but showing the opposite side thereof and having portions broken away to disclose the construction thereof.
Figure 4:
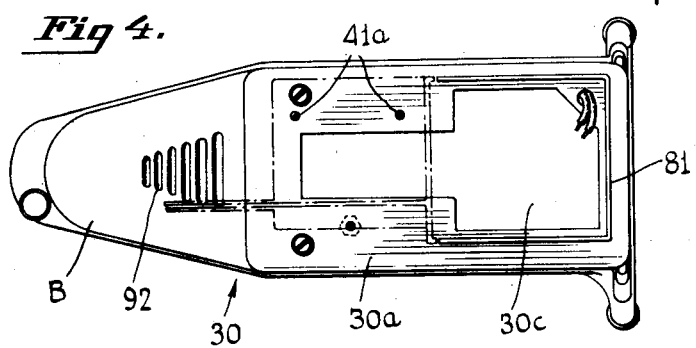
Fig. 4 is a cross-sectional view taken substantially on the line 4—4 of Fig. 3.
Figure 5:
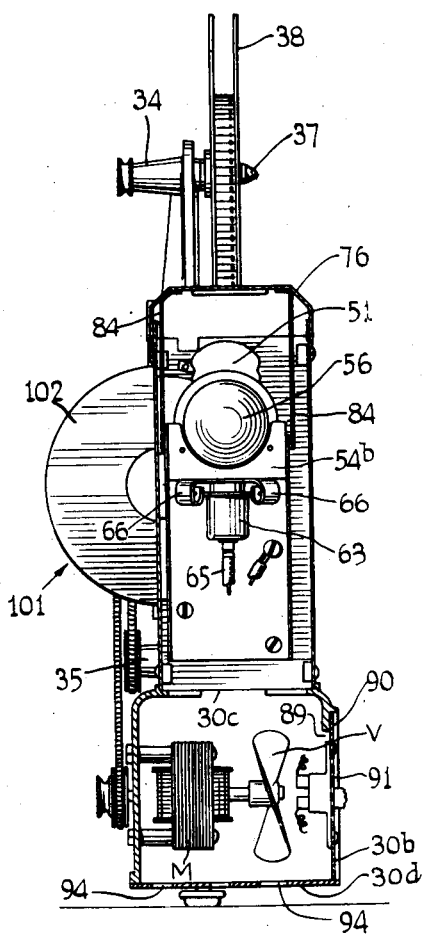
Fig. 5 is a cross-sectional view taken substantially on the line 5—5 of Fig. 3.

As shown in Figs. 1 to 5, the projector 10 comprises a base 30 which is adapted to house an electric motor M of usual construction, the switches S and S', and ventilating fan V, which are shown and described in greater detail in our said copending application, Serial No. 146,182. Attached to the top wall 30a of the base 30 is a main supporting frame 31 substantially rectangular in shape and having integrally cast extensions or reel arms 32 and 33, as clearly shown in Figs. 1 and 3. The reel arms 32 and 33 are provided with integrally cast bearing brackets 34 and 35 (see Fig. 5), into which there is journaled the shafts 36 and 37, which are designed to receive thereon for rotation therewith suitable take-off and take-up reels 38 and 39. The reel arms 32 and 33 may be provided with reinforcing ribs 32a and 33a, if desired. The frame 31 is provided with an integrally cast portion 31a which extends from the bottom edge of the said frame 31 at right angles thereto and is adapted to overlie the top wall 30a of the base 30. Integral with the frame 31 and with the portion 31a is a vertical wall 31b disposed at right angles to the portion 31a and also to the body of the frame 31. The wall 31b is so constructed and arranged as to serve as one side wall of the lamp house 40, in a manner which will be described in greater detail hereinafter. The portion 31a of the frame 31 may be fixed to the base 30 by any suitable attaching means, such as for example a plurality of screws 41, passing through the frame portion 31a and received in the threaded holes 41a in the top wall 30a of the base (see Fig. 4), so that the frame 31 is held rigidly in upright position.

The frame 31 is so designed and constructed that, in addition to supporting the reels 38 and 39, it is adapted to be used as a support for the intermittent film movement mechanism, the film sprocket wheels 43 and 44, the lens holder support 57, the film passageway 46, and a chain of gearing for actuating the film movement, shutter and sprocket wheels in synchronism, all of which are fully described in our said copending application, Serial No. 146,182.

In accordance with our invention, there is disclosed a light source mounting comprising a bracket 50 adapted to have mounted thereon a light source which is preferably a lamp 51 of the prefocus type, as shown. To insure the proper positioning and alignment of the light source 51 with respect to the optical system and the reflector to be hereinafter more fully described, the lamp bracket 50 is rigidly fixed to a plurality of lugs 52, which may be cast integrally with the wall 31b (see Figs. 2 and 3). The lamp bracket 50 is provided with holes designed to be in registered relationship with the lugs 52. The said lugs 52 may be provided with threaded openings into which there is received the screws 53 to solidly and accurately hold the lamp bracket in aligned relationship with respect to an aperture 100 in the wall 31b. The bracket 50 comprises a wall 54 substantially parallel to the wall 31b and a pair of parallel walls 55 extending outwardly from the wall 54, the said parallel walls 55 being of substantially triangular shape, as shown in Fig. 3. A portion 54a of the wall 54 is bent over at right angles thereto to form a flat table support for the mounting of the prefocus lamp 51. Integral with the portion 54a is a portion 54b extending upwardly at right angles thereto, and parallel to the wall 54, which portion is adapted to serve as a mounting or holder for the reflector 56. The side walls 55 of the lamp bracket 50 may be weldedly fixed to an inturned flange of the portion 54b and the reflector 56 may in turn be riveted to the inner surface of the portion 54b.

It is noted from the above-described construction that the reflector 56 and the lamp bracket 50 for holding the light source 50 are of rigid construction, so that when assembled they will always be in constant alignment with respect to the aperture 109 in the wall 31b, which, in turn, is designed to be in proper optical alignment with the film apertures in the film passageway 46. To insure constant and proper alignment of the lens with the reflector 56 and film apertures above mentioned, there is provided a lens holder support 57 which is permanently attached to the frame 31. Into this lens holder support 57 there is slidably mounted a lens holder 58 which carries a lens of usual construction. The longitudinal axis of the lens holder 57 is designed to be in axial alignment with the film passageway apertures and the light aperture 109 in the wall 31b.

In accordance with our invention, the entire optical system beginning with filament of the light source 51 and including the reflector 56 and the light aperture 109, as well as the film passageway apertures, are always in proper alignment, so that once the projector is assembled, there is no further need for adjustments in alignment and the optical system will be prevented from becoming disaligned through vibration or jarring or for any other reason.

Figure 6:
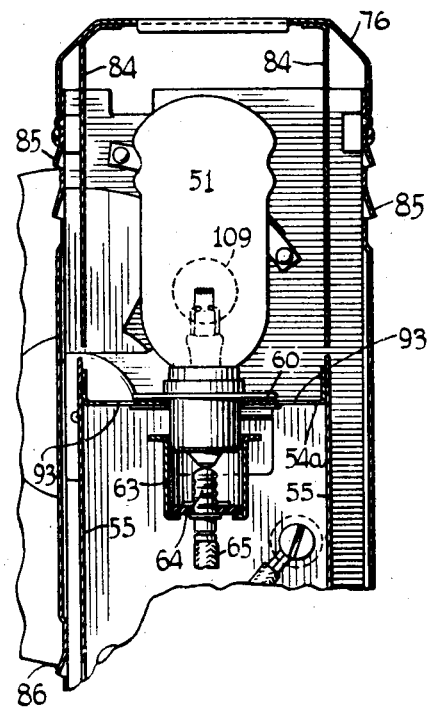
Fig. 6 is an enlarged cross-sectional view taken substantially on the line 6—6 of Fig. 3.
Figure 7:
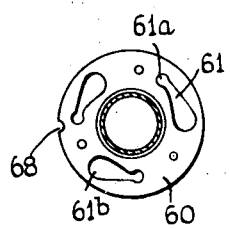
Fig. 7 is a detail view of the prefocus flange of the lamp shown in the drawings.
Figure 8:
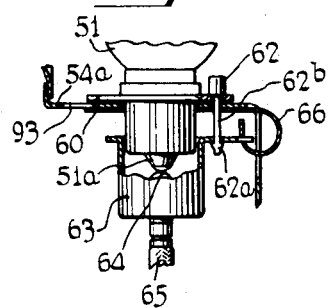
Fig. 8 is a cross-sectional view taken substantially on the line 8—8 of Fig. 2.

The light source 51 is removably mounted on the lamp bracket 50 in the following manner: The lamp 51 is provided with a prefocus sleeve 60 (see Figs. 5, 6 and 7) which is permanently attached to the base of the lamp 51 after it has been properly focused, and is so arranged that the distance from the prefocus sleeve 60 to the filament center of the lamp will be substantially identical with the distance from the horizontal shelf 54a to the center of the reflector 56 when the lamp 51 is properly mounted. To mount the lamp 51 on the wall 54a there is provided a plurality of notches 61 in the prefocus sleeve 60 (see Fig. 7), said notches 61 having enlarged end portions 61a and 61b, and are adapted to have received therein the pin projections 62 mounted in the wall 54a (see Fig. 8). The pins 62 are provided with reduced diameter shanks 62b projecting downwardly below the wall 54a a predetermined distance and are adapted to support a lamp socket 63 carrying an electrical contact member 64 leading to a source of electrical supply (not shown) by means of the lead line 65. The socket 63 is held in spaced relationship with respect to the wall 54a by means of resilient members 66. The socket 63 is limited in its downward movement with respect to the wall 54a and held in such limited position by means of the enlarged end portions 62a of the projections 62. When it is desired to mount the lamp 51 in position on the bracket 50, the enlarged notch ends 61b are aligned with respect to the projecting pins 62, after which the lamp 51 is pressed downwardly so that the contact portion 51a thereof presses against the contact member 64 to force the socket 63 downwardly against the action of the springs 66. The lamp 51 is then turned slightly so that the shanks 62b of the projections 62 are received in the ends 61a of the notches 61, and thus held firmly in position. At the same time, electrical contact is made between the member 64 and the contact portion 51a of the lamp 51.

To facilitate the registration of the notches 61 with the pins 62, there is provided a notch 68 (see Fig. 7) in the periphery of the prefocus flange 60, said notch 68 being adapted to be initially positioned substantially in alignment with the axis of the optical system and then turned in a clockwise direction to firmly fix the lamp in position in the manner hereinbefore described.

A housing of substantially rectangular cross section is provided for completely enclosing the lamp 51 together with the lamp bracket 50 and reflector 56. Said housing comprises the sides 73, 74 and 75 of a three-sided integral metal casing, removable as a unit, the fixed wall 31b of which serves as the fourth side, and a removable cover 76. The wall 31b is provided with lugs 77 projecting inwardly of the housing and having screw-threaded holes 78 therein. The wall 31b is then provided with longitudinal ridges 79 at opposite longitudinal edges thereof. The parallel sides 73 and 75 are provided with apertures adapted to register with the apertures 78 in the lugs 77, so that the three-sided metal casing may be fixed to the wall 31b by means of screws 80. The ridges 79 serve as an aid in positioning the three-sided casing part and at the same time form a light seal to prevent loss of light at the junction of the sides 73 and 75 with the wall 31b. The lower edge of the three-sided casing is adapted to rest on the top wall 30a of the base 30 and is positioned by means of a ridge 81 (see Fig. 4) corresponding to the bottom edges of the sides 73, 74 and 75. Said ridge 81 also serves to prevent loss of light from within the housing at the junction of the top wall 30a of the base 30 and the three-sided casing. An opening 30c is provided in the top wall 30a of the base 30, communicating with the interior of the lamp housing.

The removable cover 76 is designed to completely enclose the top of the lamp housing and comprises a top wall and a continuous side wall thereof adapted to telescopically fit over the top edges of the sides 73, 74 and 75 and the wall 31b. The top wall of the cover 76 is provided with louvres 83, said louvres 83 being so designed as to provide ventilation for the lamp housing with a minimum loss of light. The cover is also provided with a three-sided downwardly extending jacket 84, which may be weldedly attached to the under surface of the top wall of the cover 76. The jacket 84 is designed to fit inside of the lamp housing and to be spaced from the sides 73, 74 and 75 of the three-sided casing. By the above described construction, it is seen that the jacket 84 completely surrounds the lamp 51 and reflector 56 on three sides, thereby creating a double wall with an air space between said walls of the jacket 84 and of the sides 73, 74 and 75. This construction tends to keep excessive heat away from the sides of the lamp house and also provides a more efficient updraft passage to the louvres 83 because of the difference in the temperatures of the said double walls. The sides 73, 74 and 75 are also provided with louvres 85 adjacent the top and louvres 86 adjacent the bottom thereof. The sides 73, 74 and 75 may also be provided with reinforcing vertically disposed ridges 87, as shown in Fig. 1 of the drawings.

A portion of the free longitudinal edge of the casing side 73 may be notched, as shown in Fig. 2, to provide clearance for the operation of the rotating shutter 100.

It is noted that the construction, as above described is so designed that the top of the lamp 51 is approximately flush with the top of the three sides 73, 74 and 75 of the lamp housing, so that when the cover 76 is removed, easy access may therefore be had for the removal of the lamp 51 for any desired purpose, such as replacement or adjustment.

The interior of the lamp housing is cooled by means of a fan V (see Fig. 5) attached to the motor shaft 95 and disposed entirely within the base 30. A portion of the side wall 30b of the base 30 is provided with an aperture 89 which is covered over by a switch plate 90 (see Figs. 1 and 5), said switch plate being provided with a plurality of ventilating apertures 91 communicating directly with the outside atmosphere. When the motor M is set in operation, the fan V will draw air from the surrounding atmosphere outside of the base through the ventilating apertures 91, said air being then forced upwardly through the lamp housing and out through the louvres 83 to ventilate said lamp house. The front portion B of the base may also be provided with a plurality of ventilating apertures 92.

Apertures 93 may be provided in the wall 54a adapted to furnish an unobstructed upward draft through the housing and on the lamp 51. The bottom wall 30d of the base 30 may be provided with a plurality of perforations 94.

To hide from view the rotating shutter 100, which partially extends beyond the lamp housing and at the same time to prevent said rotating shutter from drawing dust particles into the lamp house, there is provided a shutter housing 101 which is designed to completely enclose the projecting portion of the shutter 100 and which comprises a pair of substantially semi-circular walls 102 and 103 parallel to each other. A portion of the wall 102 is adapted to abut the side 73 to close off the lamp house.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matters herein set forth or shown in the accompanying drawings is to be interpreted as illustrative and not in a limiting sense.

Having thus described my invention, I claim as new and desire to secure by Letters Patent:

1. In a motion picture projector of the character described, the combination of a lamp house, a lamp in said lamp house, said lamp having a prefocus flange provided with slotted apertures, each of said slotted apertures comprising a pair of unequally sized enlarged portions interconnected by a narrow neck portion, a bracket within said lamp house, means for rigidly attaching said bracket to a wall of said lamp house, a lamp socket supported by said bracket, and means for removably mounting said lamp in said socket, said last named means comprising a plurality of pins projecting upwardly from said bracket, said pins being provided with enlarged heads of a size smaller than one of said enlarged portions and of larger size than the other of said enlarged portions, whereby the said heads will pass freely through the larger of the enlarged portions and upon axial rotation of said lamp flange will be disposed in the smaller of said enlarged portions to retain the lamp in the socket.

2. In a motion picture projector of the character described, the combination of a lamp house having a light aperture in one wall thereof, a support for said lamp house, a lamp having an electrical contact portion at the base thereof and a prefocus flange spaced from said base, a lamp socket having electrical contact means adapted to engage said lamp base contact portion, and means for removably supporting said lamp in said socket so that the filament center of the lamp will be in constant optical alignment with said light aperture, said last named means comprising a bracket having a top wall, said socket being shiftable toward and away from said bracket, means for fixedly attaching said bracket to said lamp house, an aperture in said top wall adapted to receive said lamp base freely therein, said bracket wall aperture being smaller in diameter than said lamp flange to limit the insertion of said lamp therethrough, a plurality of pins carried by said bracket and said socket, said pins having enlarged portions projecting upwardly from said bracket and adapted to be disposed over said flange, and cooperating means on said pins and said socket to urge said pins downwardly with the enlarged portions pressing against said flange when said lamp is inserted in said socket.

3. In a motion picture projector of the character described, the combination of a lamp house having a light aperture in one wall thereof, a support for said lamp house, a lamp having an electrical contact portion at the base thereof and a prefocus flange spaced from said base, a lamp socket having electrical contact means adapted to engage said lamp base contact portion, and means for removably supporting said lamp in said socket so that the filament center of the lamp will be in constant optical alignment with said light aperture, said last named means comprising a bracket having a top wall, means for fixedly attaching said bracket to said lamp house, an aperture in said top wall adapted to receive said lamp base freely therein, said bracket wall aperture being smaller in diameter than said lamp flange to limit the insertion of said lamp therethrough, said socket being disposed underneath said bracket wall and in alignment with said bracket wall aperture, and means for mounting said socket on said bracket, said socket being resiliently shiftable toward and away from said bracket, a plurality of pins carried by said bracket and said socket, said pins having enlarged portions projecting upwardly from said bracket and adapted to be disposed over said flange, and cooperating means on said pins and said socket to urge said pins downwardly with the enlarged portions thereof resiliently pressing against said flange when said lamp is inserted in said socket.

4. In a motion picture projector of the character described, the combination of a lamp house having a light aperture in one wall thereof, a support for said lamp house, a lamp having an electrical contact portion at the base thereof and a prefocus flange spaced from said base, a lamp socket having electrical contact means adapted to engage said lamp base contact portion, and means for removably supporting said lamp in said socket so that the filament center of the lamp will be in constant optical alignment with said light aperture, said last named means comprising a bracket having a top wall, means for fixedly attaching said bracket to said lamp house, an aperture in said top wall adapted to receive said lamp base freely therein, said bracket wall aperture being smaller in diameter than said lamp flange to limit the insertion of said lamp therethrough, said socket being disposed underneath said bracket wall and in alignment with said bracket wall aperture, and means for mounting said socket on said bracket, said last named means comprising spring members interconnecting said socket with said bracket wall, a plurality of pins carried by said bracket and said socket, said pins having enlarged portions projecting upwardly from said bracket and adapted to be disposed over said flange, and cooperating means on said pins and said socket to urge said pins downwardly with the enlarged portions thereof resiliently pressing against said flange when said lamp is inserted in said socket.

5. In a motion picture projector of the character described, the combination of a lamp house, said lamp house being open at the top and bottom thereof and comprising interconnected vertically disposed walls, a hollow support for said lamp house, said support having an opening in one wall thereof communicating with the interior of said lamp house through the bottom opening thereof, a removable cover for the top opening of said lamp house, said cover being provided with ventilating apertures, a motor in said hollow support and a fan in said hollow support adapted to be driven by said motor, and ventilating apertures in said support whereby the operation of said motor will force air through the duct comprising said lamp house and said hollow support.

OTTO W. GITHENS.
GEORGE KENDE.
EVERETT M. PORTER.